July 10, 1951   F. W. GAY   2,559,870
HOUSE HEATING SYSTEM
Filed Aug. 24, 1949   4 Sheets-Sheet 1

INVENTOR.
Frazer W. Gay
BY George D. Richards,
Attorney

July 10, 1951
F. W. GAY
2,559,870
HOUSE HEATING SYSTEM
Filed Aug. 24, 1949
4 Sheets-Sheet 2
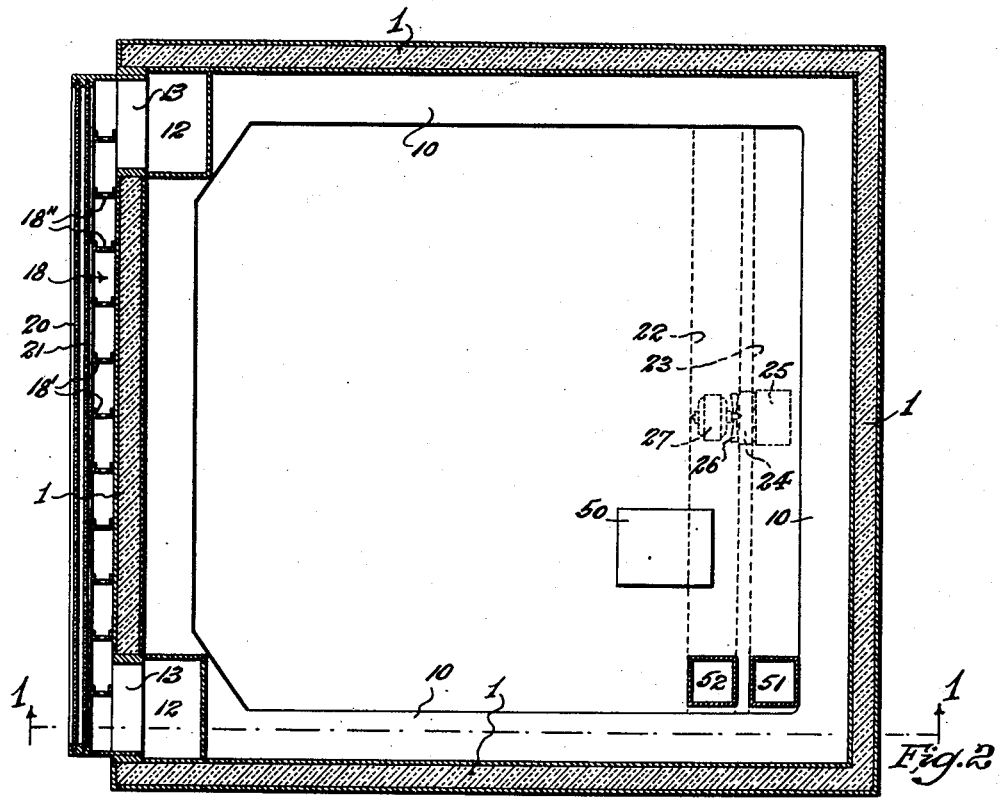
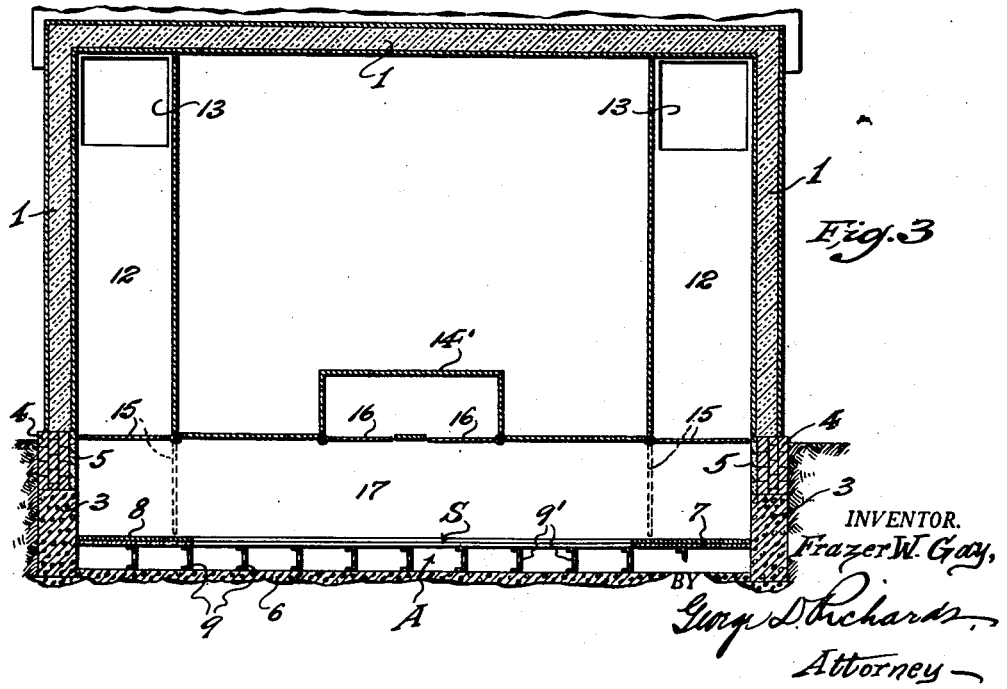
INVENTOR.
Frazer W. Gay,
BY George D. Richards,
Attorney

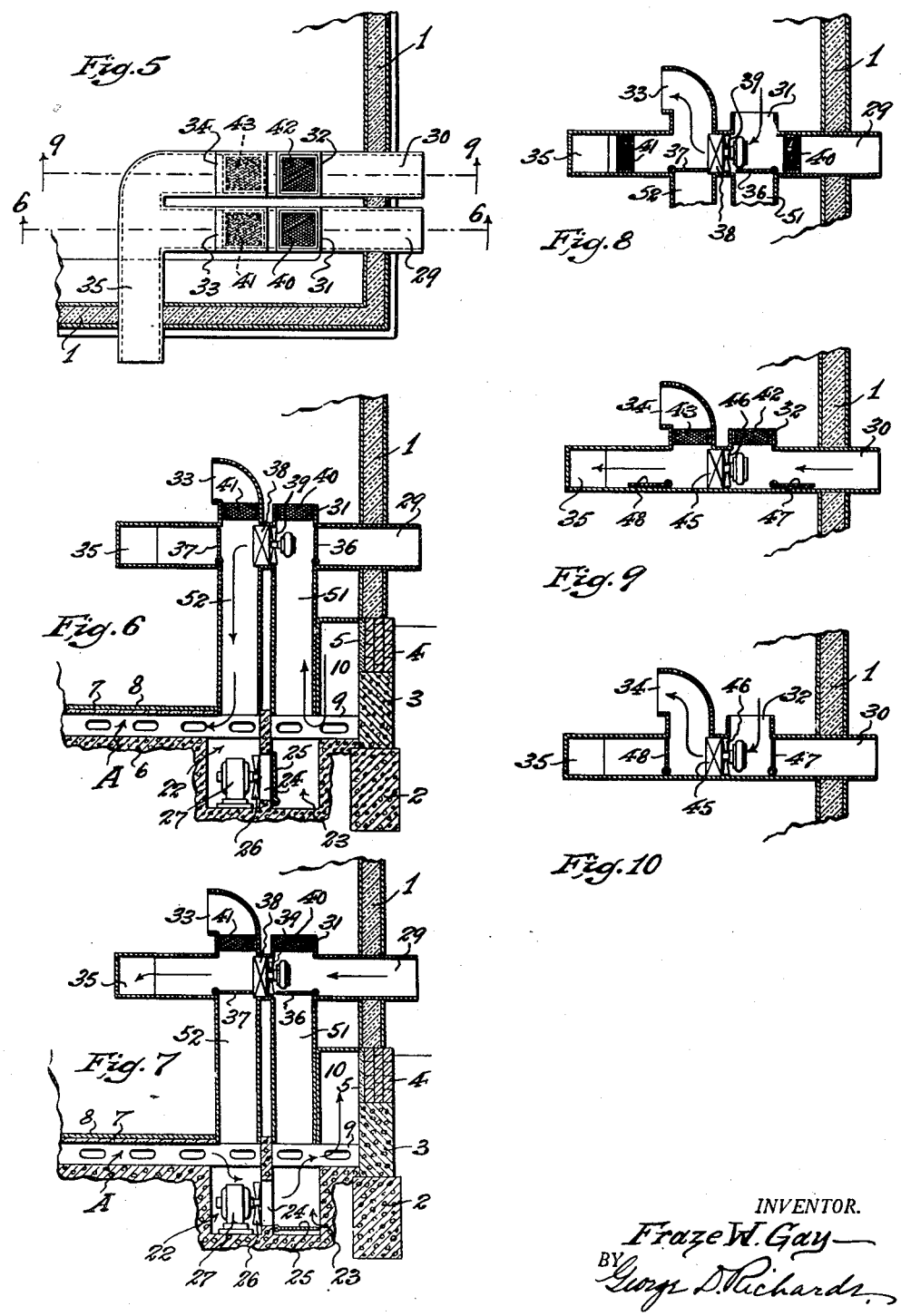

July 10, 1951   F. W. GAY   2,559,870
HOUSE HEATING SYSTEM
Filed Aug. 24, 1949   4 Sheets-Sheet 4

INVENTOR.
Frazer W. Gay,
BY George D. Richards
Attorney

Patented July 10, 1951

2,559,870

UNITED STATES PATENT OFFICE 2,559,870

HOUSE HEATING SYSTEM

Frazer W. Gay, Metuchen, N. J.

Application August 24, 1949, Serial No. 112,089

6 Claims. (Cl. 237—1)

This invention relates to a novel house structure and heating system therefor whereby the house is heated by a reversed refrigeration cycle or heat pump; the system including novel means for extracting heat from the ambient air and storing such heat in the earth under the house; and further including means to supplement the stored heat by heat derived from solar radiation, together with means to make the stored heat available to the evaporator of the heat pump during extremely cold weather.

The purpose of the invention is to provide an envelope of recirculating air contiguous to the earth under and around the basement of a house, the outside walls of this envelope comprising a concrete structure bedded against the earth and the inside walls of said envelope being of heat insulating character and serving to separate the air in the envelope from the air within the house; means being provided for circulating the air in said envelope, the envelope including a solar heat trap, and damper means to direct the circulated air through the latter during periods of solar radiation, whereby heat is captured by the circulated air from the solar heat trap and conducted to the earth for storage therein; means being also provided for passing air from the envelope through an evaporator in a heat pump refrigerant circuit, whereby, in extremely cold weather the heat pump receives its major supply of heat from the earth stored heat.

It is a further object of this invention to extract a portion of the latent heat in a hot condensed refrigerant liquid by passing such liquid through pipes buried in the earth under the house before delivering the condensed refrigerant through expansion valves to the evaporator of a heat pump, whereby heat thus extracted from condensed refrigerant liquid is also stored in the ground; means being provided for making this stored heat available as a source of heat for a heat pump in very cold weather.

Figure 1:
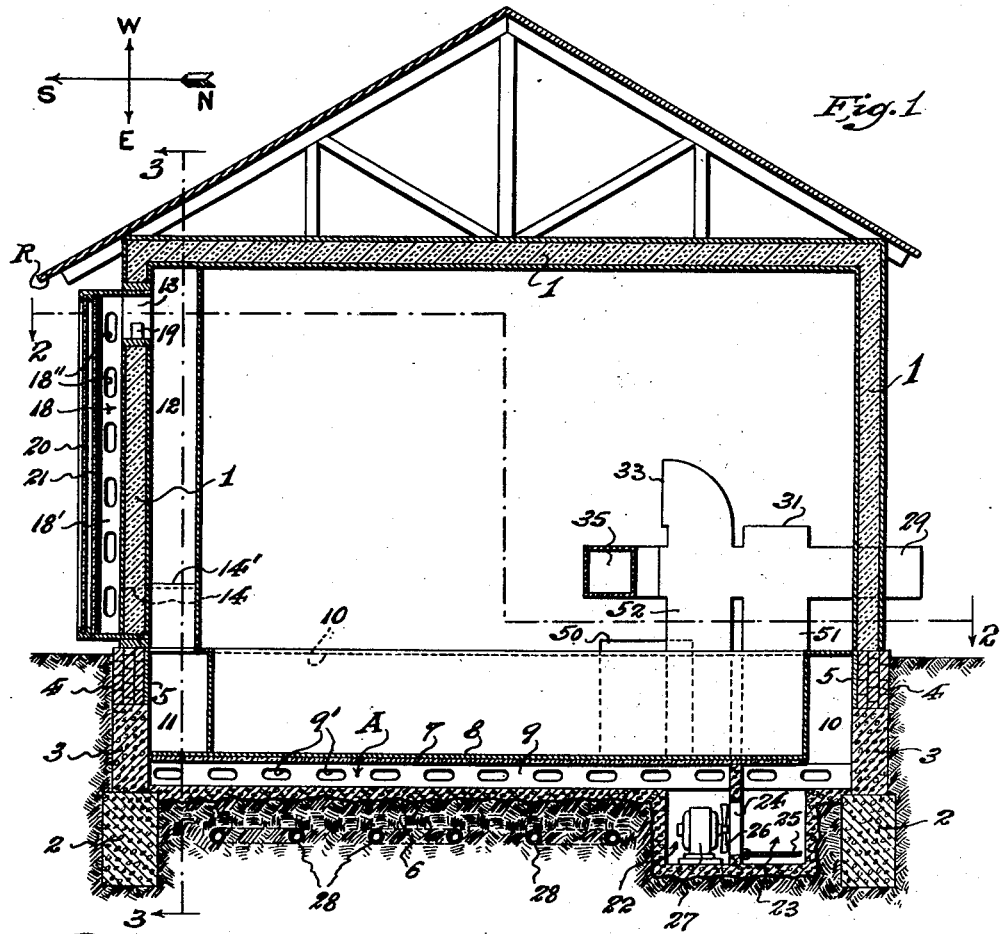
Figure 4:
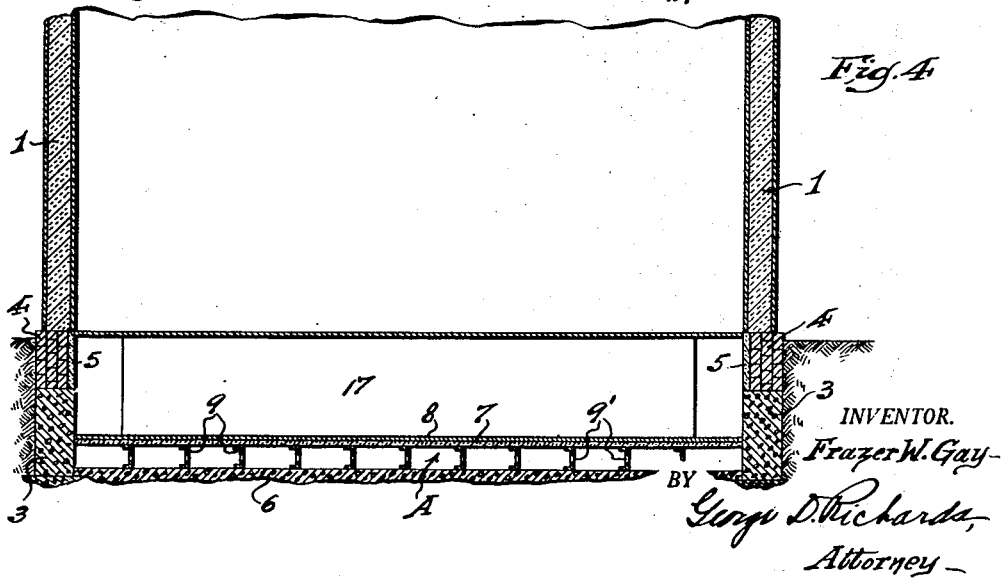

These and other objects of the invention will become more apparent as the description proceeds with the aid of the accompanying drawings, in which:

Fig. 1 is a transverse vertical section through the house structure, taken on line 1—1 in Fig. 2; Fig. 2 is a horizontal section, taken on line 2—2 Fig. 1; Fig. 3 is a cross sectional view, taken on line 3—3 in Fig. 1; Fig. 4 is a cross-sectional view similar to that of Fig. 3, but omitting the solar heat trap; and Fig. 5 is a plan view, with house walls in section, showing the exchanger compartments for a heat pump.

Figs. 6, 7 and 8 are vertical sectional views, taken on line 6—6 in Fig. 5, and respectively showing various settings of dampers for supplying air to the evaporators of an exchanger compartment for a heat pump; and Figs. 9 and 10 are vertical sectional views, taken on line 9—9 in Fig. 5, respectively showing different settings of dampers for controlling air circulation through a condenser of the heat pump.

Figs. 11 to 14 are graphs illustrating performance results of the heating system according to this invention.

Similar characters of reference are employed in Figs. 1 to 10 inclusive to indicate corresponding parts.

Referring to the drawings, the reference character 1 indicates the shell of the house structure which is packed with insulating material, such e. g. as mineral wool, between the studs in the vertical walls and between the beams of the ceiling, thus to provide, in well known manner, a house structure with all of its outside walls fully insulated.

The house shell 1 is supported on a foundation comprising masonry walls 3 carried by footings 2. Included in the upper portion of the foundation walls 3 are external brick sections 4 faced on inner sides with heat insulating sections 5, such as coatings of vermiculite cement. Contiguous to the inner faces of the north, east and west sides of the foundation walls 3 is a continuous air duct structure 10. Contiguous to the inner face of the south side of the foundation wall is a center chamber 17 which terminates at its respective ends in end chambers 11. In the corners of the house shell 1, at the south side thereof, are vertical duct structures 12 which respectively connect the respective end chambers 11 with respective openings or ports 13 through which recirculating air may be delivered to and through a solar heat trap 18 which is externally mounted on the south wall of the house structure. The lower portion of the solar heat trap 18 communicates with a collection chamber 14' through an opening or port 14.

The basement of the house structure is provided, contiguous to the underlying earth, with a concrete sub-floor 6. Supported upon this sub-floor 6 are a plurality of spaced apart metallic channel or I-beams 9, the webs of which are pierced by a multiplicity of openings or holes 9'. Supported upon the channel or I-beams 9 is a main floor 7, which is made of suitable insulating material, such as vermiculite concrete; the upper or exposed surface of said main floor being faced with suitable overlaid flooring 8 to provide a desirable wearing surface. The floor construction thus formed provides an air space A between the sub-floor 6 and main floor 7; the compartments of this air space A, which are defined by the channel or I-beams 9, intercommunicate through the openings or holes 9' of the latter.

The solar heat trap comprises an air space 18 formed between the south wall of the house structure and an external wall formed by double glassed windows 20 and 21. Said windows 20 and 21 are supported by metallic channel or I-beams 18' which are provided with openings or holes 18'' in their webs so that the compartments of the air space 18, which are defined by said channel or I-beams, intercommunicate so as to provide in effect a single air space from side to side of the solar heat trap. The roof of the house structure is extended as at R so as to overhang the south side of the house, and thus shade the south wall thereof and the included solar heat trap.

Two parallel air ducts 22 and 23 are countersunk in the earth beneath the basement of the house structure so as to extend between its east and west sides. These air ducts 22 and 23 are connected for communication by an opening or port 24. An air impelling fan 26, preferably driven by an electric motor 27, when in operation, moves air from air space A through duct 22 into duct 23, whence the air may pass from the latter into that part of the air duct 10 which extends along the north wall of the house, and thence through the air duct 10 along the east and west walls of the house into the chambers 11. When dampers 15 between the chambers 11 and vertical ducts 12 are disposed in the positions thereof shown by broken lines in Fig. 3, air from air duct 10 passes upwardly through the vertical ducts 12, and thence through openings or ports 13 into the solar air trap 18. Air heated by solar radiation within the solar air trap 18 is discharged therefrom through the opening or port 14 into the collection chamber 14' which communicates with chamber 17; such communication being controlled by dampers 16. When these dampers 16 are open, the air heated by solar radiation may flow from the chamber 17 through slots S in the basement floor 7 into the air space A, and thence back into duct 22 in its recirculating course. The opening or port 24 may be opened and closed, according to operating conditions involved, by a damper 25. The dampers 15, 16 and 25 are adapted to be electrically actuated, and the motor 27 is adapted to be started and stopped by electrical control means. An electric eye 19, operated by solar irradiation, is provided to actuate the damper and motor controls, so as to set the dampers and run the motor 27 during periods of sunshine, whereby to recirculate air through the solar air trap 18, but so as to close the dampers and stop the motor 27 at all other times.

A conventional heat pump 50 is connected to its evaporator unit 38 and to its condenser unit 45 in manner to provide a reverse refrigeration cycle.

The evaporator unit 38 is mounted across a cold air duct 29 leading into the interior of the house from the outside ambient air. This cold air duct 29 terminates at its inner end in a discharge branch 35 which extends through the house wall back to the outer ambient air. A riser 51 extends from the air duct 23 to communicate with the cold air duct 29 adjacent to the air intake side of the evaporator 38. A similar riser 52 leads from the cold air duct 29 adjacent to the air discharge side of the evaporator 38 for communication with the air duct 22. A damper 36 is manipulable to open the intake portion of the cold air duct 29 while closing the riser 51 and vice versa. Similarly, a damper 37 is manipulable to close the discharge branch 35 of the cold air duct 29 while opening communication between said cold air duct and the riser 52 and vice versa. An air impeller fan 39 is mounted within the cold air duct 29 adjacent the air intake side of the evaporator 38, the same being operative to move the air through the latter. Adjacent to the air intake side of the evaporator 38, the cold air duct 29 is provided with an intake passage or port 31 leading thereinto from the house interior, and is further provided, adjacent to the air discharge side of the evaporator 38, with an air discharge passage or port 33 which communicates with the house interior. Said passages or ports 31 and 33 may respectively be closed, when desired, by respective removable insulating blocks or partitions 40 and 41 adapted to be disposed across the same.

The condenser unit 45 is mounted across a second air intake duct 30 leading into the interior of the house from the outside ambient air, the inner end of said duct 30 being connected with and for discharge through the discharge branch 35 to the exterior atmosphere. An air impeller fan 46 is mounted within said air intake duct 30 adjacent to the air intake side of the condenser 45, said fan being operative to move air through the latter. Adjacent to the air intake side of the condenser 45, the air intake duct 30 is provided with an intake passage or port 32 which leads thereinto from the house interior, and is further provided, adjacent to the air discharge side of the condenser 45, with an air discharge passage or port 34 which communicates with the house interior. A damper 47 is manipulable to close the intake end of the air intake duct 30, when it is desired to pass air from the house interior, received through the intake passage or port 32, through the condenser 45, and another damper 48 is manipulable to close the discharge end of the air intake duct 30, whereby to discharge the air, thus passed through the condenser 45, back to the house interior through the air discharge passage or port 34. Said passages or ports 32 and 34 may be respectively closed, when desired, by respective removable insulating blocks or partitions 42 and 43 adapted to be disposed across the same.

A line of piping 28 is buried in the earth a short distance beneath the sub-floor 6, said piping being looped back and forth in the earth, and so connected between the condenser 45 and heat pump 50 that the hot condensed refrigerant leaving the condenser first flows through the piping in the warmest earth which is near the south wall of the house and last through coolest earth which is near the north wall of the house. In a well designed system, about 15 per cent of the heat leaving the heat pump can be recovered from the hot infrigerant condensate and stored in the earth around the piping 28, whereby to make a large part of this stored heat available to the heat pump in very cold weather. Furthermore, the extraction of this heat renders the heat pump more efficient for summer cooling operation, since the heat extracted by the earth would otherwise be dumped back into the cold space of the heat pump. Such extraction of heat, however, has little effect upon heat pump operation under winter conditions. Attention may here be called to the fact that, where solar energy is not available, the piping 28 may supply most of the heat, a small amount being extracted from the earth. This latter condition is illustrated in Fig. 4 wherein the solar heat trap 18 and its damper controls are omitted, and the air duct 10 is arranged to pass around the south side of the building as well as the north, east and west sides thereof. Under these modified conditions the piping 28 is depended upon to furnish most of the stored heat that is required in operation of the system.

In Fig. 6 is shown the conditioning of the heat pump for operation in extreme cold weather, and so as to draw upon heat stored in the earth. To thus condition the heat pump, the dampers 36 and 37 are set to close the cold air intake duct 29 and open communication between the risers 51 and 52 through the evaporator 38. When the heat pump is thus conditioned, air passes from the air duct 10 into the duct or chamber 23, thence upwardly through the riser 51 to pass through the evaporator 38, and thence downwardly through the riser 52 and duct chamber 22 so as to be directed through the air space A to chamber 17, and thence back to air duct 10. The air thus circulated picks up heat from the supply thereof which has been stored in the earth contiguous to the air space A. When the heat pump is thus conditioned for extreme cold weather operation, the insulating blocks or partitions 42 and 43 are removed to open the passages or ports 32 and 34, and the dampers 47 and 48 are disposed to close the intake and discharge portions of the cold air duct 30, all whereby air from the house interior may be delivered through the passage or port 32 so as to be driven through the condenser 45 to take up heat therefrom, and then returned to the house interior through the passage or port 34 (see Fig. 10).

In Fig. 7 is shown the conditioning of the heat pump for operation in moderate winter or less than extreme cold weather. To thus condition the heat pump, the dampers 36 and 37 are set to close the risers 51 and 52 against recirculation of air therethrough, and so as to open the air intake duct 29 for passage of outer air through the evaporator 38 and back to the atmosphere through the discharge branch 35; thus utilizing heat of the ambient air for evaporator operation, and conserving the earth stored heat. Under these circumstances, the setting of the dampers 47 and 48 in the air intake duct 30, which serves the condenser 45, remains the same as shown in Fig. 10, and as above described.

In Fig. 8 is shown the conditioning of the heat pump for operation in summer or hot weather. To condition the heat pump for service under such conditions, the blocks or partitions 40 and 41 are removed from and so as to open the passages or ports 31 and 33, and these or similar blocks or partitions are positioned across the intake section and discharge section of the air intake duct 29, respectively outwardly of or beyond the respective passages or ports 31 and 33. At the same time the dampers 36 and 37 are disposed to shut off the risers 51 and 52. When such changes are effected, and the heat pump is put in operation, air from the house interior enters the duct 29 and passes through the evaporator 38, so as to give up heat thereto, the cool air leaving the evaporator being thereupon returned to the house interior through the port or passage 33. During such summer or hot weather operation of the heat pump, as shown in Fig. 9, the ports or passages 32 and 34, communicating between the house interior and the air intake duct 30, are respectively closed by the blocks or partitions 42 and 43, whereby air from out of doors enters through the intake duct 30, to pass through the condenser 45, so as to take up heat therefrom, the hot air leaving the condenser being thereupon discharged to the out door atmosphere through the discharge branch 35 with which the intake duct 30 communicates.

Figure 11:
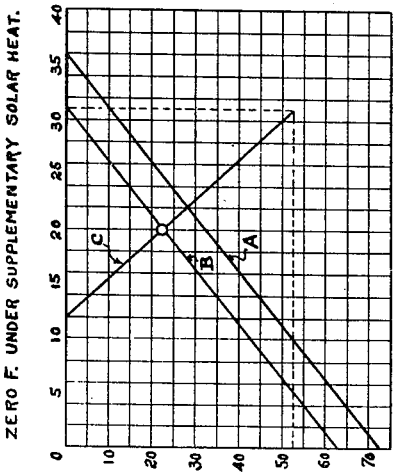
Figure 12:
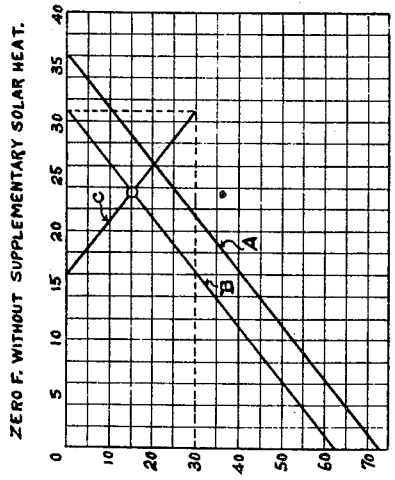

Referring now to the graph of Fig. 11, curve A is plotted between outdoor temperature as ordinate and B. t. u. per hour heat requirement as abscissa. Curve A shows that at a zero degree F. outdoor temperature, 36,000 B. t. u. per hour is assumed to be required to heat the house. It is further assumed that losses will amount to 5,000 B. t. u. per hour flowing continuously. Curve B indicates the house heating requirement demand on the heat pump. Assuming that the heat pump possesses a heat pumping capacity from zero degree F. of 12,000 B. t. u. per hour; the capacity of the heat pump to supply heat will increase with rise in temperature of the air entering the evaporator 38 approximately in accordance with curve C. Curve C shows that the heat pump will be able to pump all the heat required to heat the house directly from outdoor air down to an outdoor temperature of 22° F.; i. e. at an outdoor temperature of 22° F., the house will require 20,000 B. t. u. per hour from the heat pump (curve B) and this will be the output of the heat pump at 22° F. (curve C).

Since the house will require 31,000 B. t. u. per hour at an outdoor temperature of zero degree F., and since curve C shows that at 31,000 B. t. u. heat pump capacity the temperature of the air delivered to the evaporator 38 must be 51.5° F.; then under the conditions shown in Fig. 6, the air temperature may be boosted to the required degree by circulation through the air space A so as to take up heat from heat stored in the underlying earth. Such supplementary or boosting heat may be easily stored in the underlying earth by utilizing the solar heat trap and by heat salvaged from hot refrigerant liquid circulating through the piping 28.

If the solar heat trap is omitted and only the heat transfer piping 28 is used to furnish heat for earth storage, then the temperature of the air circulated through the flow air space A will be much lower than the required 51.5° F. above mentioned. By reference to the graph of Fig. 12 it will be seen, if a minimum temperature of 30° F. is found, then the heat pump must be of greater capacity, as indicated by curve C of the Fig. 12 graph. This larger heat pump should have a capacity of 16,000 B. t. u. per hour at zero degree F., about 23,500 B. t. u. per hour at 15° F., and about 31,000 B. t. u. per hour at 30° F. Such heat pump will be able to heat the house, using outdoor air as a source of heat, down to about 15° F.

Figure 13:
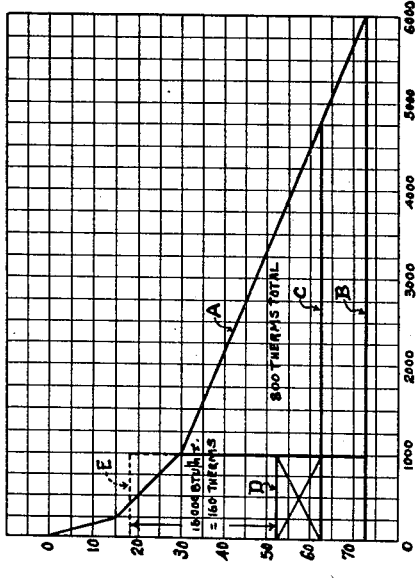

Referring to the graph of Fig. 13, curve A is plotted between outdoor temperature as ordinate and hours per year is abscissa. The first 250 hours at the left indicates that the coldest 250 hours vary between zero degree F. and 15° F.; it being understood that these coldest hours are not consecutive, but are arbitrarily grouped together as shown. Curve B indicates the constant indoor temperature at 72° F. The vertical distance between curves A and B at any temperature indicates the drop in temperature across the insulated house shell or walls at 72° F., and if the house shell or walls pass 500 B. t. u. per hour per degree F. difference in temperature, then the vertical distance in degrees F. multiplied by 500 will give the B. t. u. per hour that is required to maintain the house interior at 72° F. for that temperature. If, for example, the living losses are taken to be 5000 B. t. u. per hour, the distance between curves B and C will represent these living losses. At any temperature, the vertical distance in degrees F. between curves C and A multiplied by 500 indicates the required heat pump output at that temperature. Assuming the system makes use of stored heat derived from the solar heat trap and from heat salvaged from hot condensate, if the heat pump operates to pump heat from outdoors at all temperatures above 30° F. and pumps stored heat from the earth at all temperatures below 30° F., e. g. during the 1000 coldest hours of the year, and the average temperature for these hours is e. g. about 19° F., as indicated by curve E, the distance between curves C and E is 43° F., therefore, the heat pump must pump 43 times 500 or 21,500 B. t. u. per hour as an average. If the co-efficient of performance is taken to be about 4, then the heat pump losses will be, on estimate, about 5500 B. t. u. per hour, and the balance, viz. 16,000 B. t. u. per hour, will have to be taken from earth stored heat, or about a total of 160 therms from combined solar energy storage and heat salvaged from hot condensed refrigerant.

Assuming, however, that a solar heat trap is not used or not available, and that only stored heat derived from hot condensed refrigerant plus some heat extracted from the earth itself is available to supply the heat pump, then the temperature of the air recirculating in contact with the earth in space A will be much lower, say about 30° F. (see Fig. 12). Under these circumstances the heat pump must be of much larger capacity so as to pump the required 31,000 B. t. u. from the 30° F. air circulating in the space contiguous to the earth. Assuming this larger heat pump to have a capacity of 16,000 B. t. u. per hour at zero degree F., it will have sufficient capacity at 15° F. to supply the 23,500 B. t. u. per hour which is required to be pumped using outdoor air as a heat source. However, from the standpoint of efficiency, it is desirable to draw all heat from earth storage for temperatures lower than 22.5° F.

Figure 14:
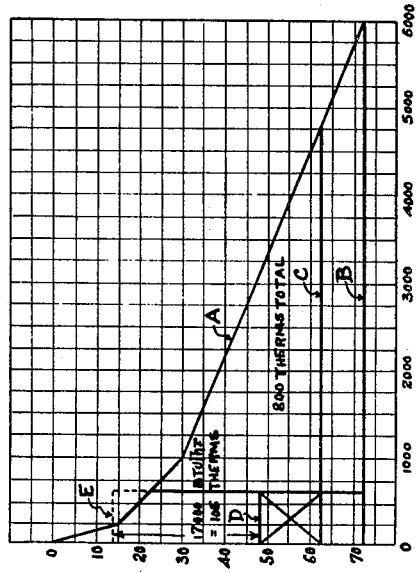

Referring to the graph of Fig. 14, it is assumed that the average outdoor temperature for 625 coldest hours of the year is 14° F., and that the total (average) heat demand from the heat pump is 62–14 or 48° F., i. e. about 24,000 B. t. u. per hour. Under these circumstances, if the coefficient of performance is taken as about 3.5, then the heat pump losses will approximate 7,000 B. t. u. per hour, and the balance required to be taken from earth stored heat will be about 17,000 B. t. u. per hour, or about 106 therms. The major part of this heat will be taken from the stored supply although an appreciable part will be taken from residual heat of the earth. This is possible for the reason that average earth temperature at a depth of ten feet, where the earth surface is exposed to the elements in winter weather, is about 45° F. Under small houses, however, the average temperature of the underlying earth is about 50° F., and under very large heated buildings such earth temperature, at ten foot depth, may be as high as 60° F. It will, therefore, be understood that a recirculating air stream in the space A contiguous to the earth under the building, if at a low temperature of 30° F. will also draw heat from the residual heat of the underlying earth.

Having now described my invention, I claim:

1. In a house heating system, a heat pump and means to circulate its pumped heat for heating the house interior, the earth mass beneath the house being adapted to serve as a heat storage body, a refrigerant fluid evaporator for said heat pump, means to deliver heat from the house exterior across the evaporator, means adapted to be operative in extremely cold weather for delivering heat from the heat storage body to said evaporator, a solar heat trap, means for recirculating a heat transmitting fluid through the solar heat trap and contiguous to the heat storage body for transfer of solar produced heat to the heat storage body and for transfer of stored heat from the heat storage body to said evaporator, a refrigerant fluid condenser for said heat pump, means to deliver air from the house exterior across the condenser, and piping imbedded in the heat storage body through which hot condensate from the condenser passes in circulation back to the evaporator, whereby heat from said condensate is transferred to the heat storage body to supplement the heat stored therein.

2. In a house heating system, a heat pump and means to circulate pumped heat for heating the house interior, an evaporator for said heat pump, means for delivering outdoor air across the evaporator and back out of doors, a driven fan for moving air across the evaporator, the earth mass beneath the house being adapted to serve as a heat storage body, air passage space contiguous to the heat storage body through which heat transmitting air may be moved, said air passage space being in circuit with said pumped heat circulating means, a solar heat trap mounted in and exposed at the south wall of the house and adapted to be connected in communication with said air passage space, a second driven fan for moving air through said solar heat trap and said air passage space, damper means for controlling movement of air through the solar heat trap, air delivery and return ducts interconnecting between said air passage space and said outdoor air delivery means respectively on opposite sides of the evaporator, whereby to deliver stored heat transmitting air across said evaporator, and additional damper means operative in certain positions to open the outdoor air delivery means and close said delivery and return ducts and in other positions to open the latter and close the former.

3. In a house heating system as defined in claim 2, wherein the means for delivering outdoor air across the evaporator includes air admission and discharge passages communicating with the house interior respectively from opposite sides of the evaporator, and means to close said air admission and discharge passages in cold or winter weather and to open the same for passage of air from the house interior across the evaporator in hot or summer weather when said outdoor air delivering means is otherwise closed.

4. In a house heating system, a heat pump and means to circulate pumped heat for heating the house interior, an evaporator for said heat pump, means for delivering outdoor air across the evaporator and back out of doors, a driven fan for moving air across the evaporator, the earth mass beneath the house being adapted to serve as a heat storage body, air passage space contiguous to the heat storage body through which heat transmitting air may be moved, said air passage space being in circuit with said pumped heat circulating means, a solar heat trap mounted in and exposed at the south wall of the house and adapted to be connected in communication with said air passage space, a second driven fan for moving air through said solar heat trap and said air passage space, damper means for controlling movement of air through the solar heat trap, air delivery and return ducts interconnecting between said air passage space and said outdoor air delivery means respectively on opposite sides of the evaporator, whereby to deliver stored heat transmitting air across said evaporator, additional damper means operative in certain positions to open the outdoor air delivery means and close said delivery and return ducts and in other positions to open the latter and close the former, a condenser for said pump, means including a driven fan for delivering outdoor air across said condenser and back out of doors, and piping imbedded in the heat storage body through which hot condensate from the condenser passes in circulation back to the evaporator, whereby heat from the condensate is transferred to the heat storage body to supplement heat stored therein.

5. In a house heating system as defined in claim 4, wherein said means for delivering outdoor air across said condenser includes air admission and discharge passages communicating with the house interior respectively from opposite sides of the condenser, cooperative damper means operative to open or close said last mentioned outdoor air admission means, and means to close said air admission and discharge passages when said last mentioned outdoor air admission means is open.

6. In a house heating system, a heat pump and means to circulate pumped heat for heating the house interior, an evaporator for said heat pump, means for delivering outdoor air across the evaporator and back out of doors, a driven fan for moving air across the evaporator, the earth mass beneath the house being adapted to serve as a heat storage body, air passage space contiguous to the heat storage body through which heat transmitting air may be moved, said air passage space being in circuit with said pumped heat circulating means, a solar heat trap mounted in and exposed at the south wall of the house and adapted to be connected in communication with said air passage space, a second driven fan for moving air through said solar heat trap and said air passage space, damper means for controlling movement of air through the solar heat trap, air delivery and return ducts interconnecting between said air passage space and said outdoor air delivery means respectively on opposite sides of the evaporator, whereby to deliver stored heat transmitting air across said evaporator, additional damper means operative in certain positions to open the outdoor air delivery means and close said delivery and return ducts and in other positions to open the latter and close the former, a condenser for said pump, means including a driven fan for delivering outdoor air across said condenser and back out of doors, piping imbedded in the heat storage body through which hot condensate from the condenser passes in circulation back to the evaporator, whereby heat from the condensate is transferred to the heat storage body to supplement heat stored therein, the means for delivering outdoor air across the evaporator including air admission and discharge passages communicating with the house interior respectively on opposite sides of the evaporator, means to close said air admission and discharge passages in cold winter weather and to open the same for passage of air from the house interior across the evaporator in hot or summer weather when the outdoor air delivery means is otherwise closed, and the means for delivering outdoor air across the condenser also includes air admission and discharge passages communicating with the house interior respectively on opposite sides of the condenser, cooperative damper means operative to open and close said outdoor delivery means to the condenser against flow of outdoor air, and means to close said last mentioned indoor air admission and discharge passages when said outdoor air delivery means to the condenser is open.

FRAZER W. GAY.

REFERENCES CITED

The following references are of record in the file of this patent:

UNITED STATES PATENTS

| Number | Name | Date |
| --- | --- | --- |
| 2,178,176 | Lamm | Oct. 31, 1939 |
| 2,462,557 | Santee | Feb. 22, 1949 |